United States Patent [19]

Bricker

[11] 4,242,296
[45] Dec. 30, 1980

[54] METHOD FOR MAKING CURVED HOSE

[75] Inventor: Charles E. Bricker, Centerville, Ohio

[73] Assignee: Dayco Corporation, Dayton, Ohio

[21] Appl. No.: 70,205

[22] Filed: Aug. 27, 1979

[51] Int. Cl.³ .............................................. B29C 25/00
[52] U.S. Cl. .................................... 264/149; 156/143; 156/173; 264/150; 264/166; 264/172; 264/173; 264/219; 264/236; 264/295; 264/336; 264/339; 264/347
[58] Field of Search .............. 264/150, 149, 295, 339, 264/316, 172, 173, 166, 219, 336, 236, 347; 156/143, 173

[56] References Cited

U.S. PATENT DOCUMENTS

| | | | |
|---|---|---|---|
| 4,106,967 | 8/1978 | Logan et al. | 264/339 |
| 4,110,396 | 8/1978 | Reynolds | 264/339 |
| 4,118,162 | 10/1978 | Baumgarten | 264/295 |
| 4,160,006 | 7/1979 | Patzner et al. | 264/339 |

Primary Examiner—Jeffery R. Thurlow
Attorney, Agent, or Firm—Charles E. Bricker

[57] ABSTRACT

A method for the production of curved tubular elastomeric articles such as hose is described which uses a rigid, deformable mandrel. An uncured hose assembly is placed on the mandrel, and the assembly, including the mandrel, is deformed to a preselected curvilinear configuration, and then partially cured. The partially cured hose is straightened and the mandrel is removed. The partially cured hose is then returned to the curing chamber to complete the curing.

17 Claims, 9 Drawing Figures

METHOD FOR MAKING CURVED HOSE

BACKGROUND OF THE INVENTION

This invention relates to a method for making curved hose.

Rubber hoses of curved shape are required in a variety of applications. An example of a curved hose is automotive radiator coolant hose. The customary method of making this hose is to extrude a tube, apply a reinforcement to the tube and extrude a cover layer over the reinforcement. The resulting uncured hose is cut to length and placed manually on mandrels having the shape of the desired finished hose configuration. The mandrels and the uncured hose assemblies are placed in a vulcanization unit. Here the lengths of hose are vulcanized on the mandrels in the desired configuration. The finished hose is then removed from the mandrel.

In making such curved pieces of hose, a large amount of manual work is carried out. Loading of the hose assembly onto the mandrel, though eased by the use of a considerable quantity of lubricant, is difficult. Upon unloading the hose from the mandrel, the interior wall of the hose may rip or tear.

It has been proposed, in U.S. Pat. No. 4,110,396, to employ a mandrel having a "mechanical memory", i.e. a mandrel which may be mechanically deformed to a desired shape and which, upon heating, changes its shape to a preselected shape. Although this method alleviates or abolishes many of the problems normally associated with the use of a rigid mandrel, this method is not well adapted to mechanized production of curved rubber hose.

A relatively automatic and continuous process for making curved rubber hose is described in U.S. Pat. No. 4,118,162. In this process, a plurality of flexible mandrels are conveyed from a mandrel magazine in end-to-end fashion to a first extruder which covers the flexible mandrels with a rubber layer. A reinforcing thread is wrapped over the rubber layer and a second rubber layer is then extruded over the thread. Each individual mandrel is cut off from the line together with the rubber mix surrounding it. Each mandrel, and its associated rubber mix is bent to a desired shape and the rubber is then vulcanized. Following vulcanization, the mandrel is removed and returned to the mandrel magazine. It appears that this method can only be used to produce hose having a single curve in only one plane.

It is, therefore, an object of the present invention to provide a novel process for making curved rubber hose.

Other objects, aspects and advantages of the present invention will be apparent to those skilled in the art from a reading of the detailed description which follows, the appended claims and the attached drawing.

SUMMARY OF THE INVENTION

In accordance with the present invention, there is provided a process for making curved rubber hose which comprises the steps, sequentially, of providing a rigid, deformable mandrel, placing an uncured hose assembly around the mandrel, deforming the mandrel and hose assembly to a preselected curvilinear configuration, partially vulcanizing the hose assembly on the mandrel, deforming the resulting partially vulcanized hose and the mandrel to a desired configuration of lesser curvature than the preselected curvilinear configuration, removing the mandrel, and completing the vulcanization of the hose.

DETAILED DESCRIPTION OF THE DRAWING

Figure 1:
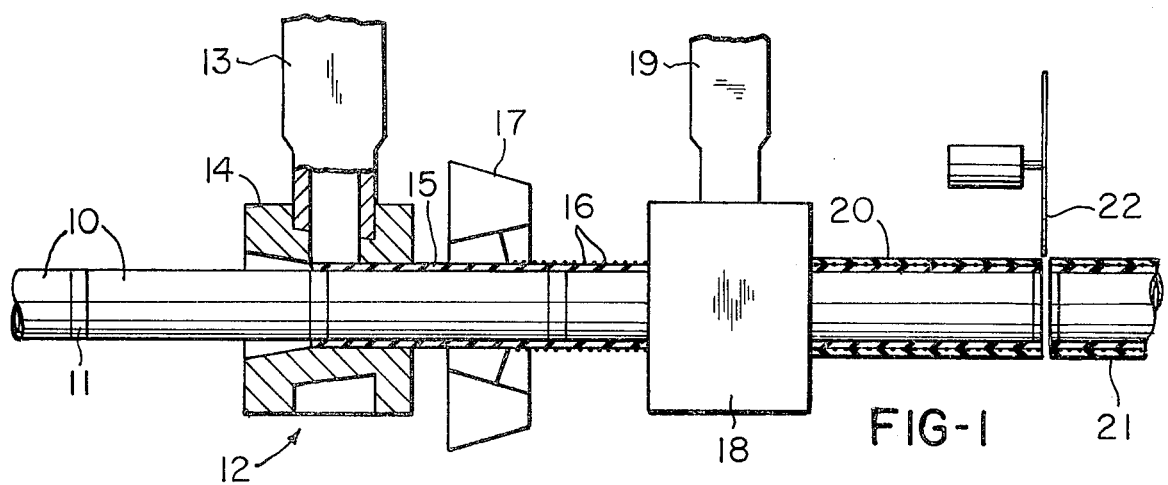
FIG. 1 is a plan view of an apparatus used to form the hose assembly on the mandrels.

Mandrels 10 are conveyed in end-to-end fashion, with spacers 11 therebetween, by a conveyor means, not shown, to an extrusion unit 12, which consists of a first extruder 13 which conveys the rubber mix prepared by it into a tubular extrusion head 14. In the head 14, the mandrels 10 and the spacers 11 are covered with a first layer 15 of rubber. A textile thread reinforcement 16 is then applied over the layer 15 by a thread reinforcing machine 17. The line of mandrels 10, spacers 11, rubber layer 15 and thread reinforcement 16 then passes through a second tubular extrusion head 18 which is supplied with a rubber mix by extruder 19. In the head 18, a second layer 20 of rubber is applied over the thread reinforcement 16. The resultant hose assembly is cut into individual lengths 21 by a cutting means 22.

Figure 2:
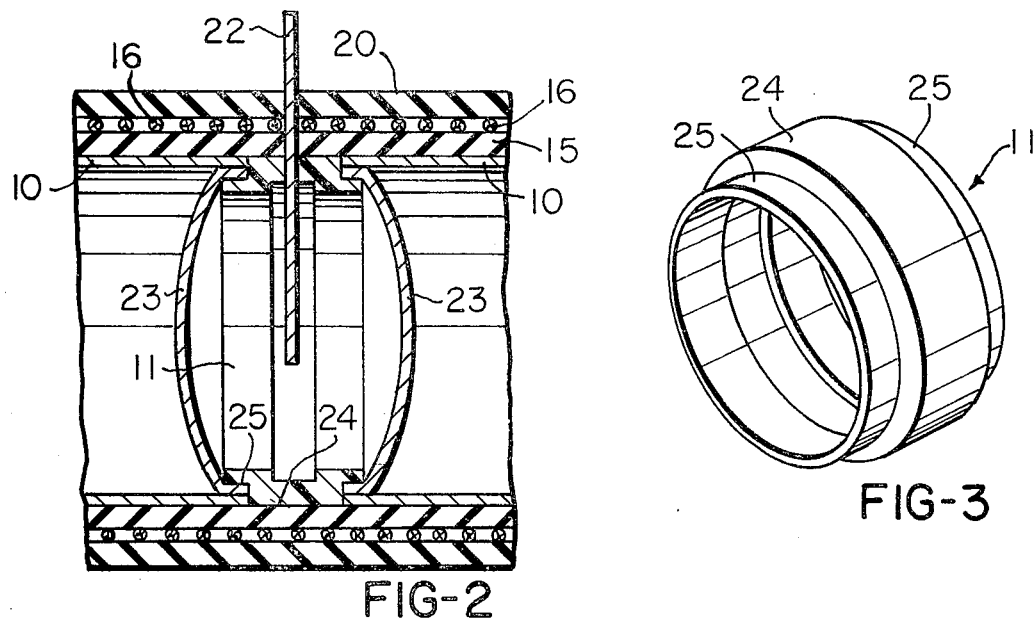
FIG. 2 is an enlarged cross section illustrating the end-to-end relation of the mandrels and the spacer therebetween.

Each mandrel 10 is a rigid, generally cylindrical shape, made of a deformable material, preferably a metal such as aluminum, steel or lead. As shown in FIG. 2, the mandrel 10 may have end closures 23 at each end. If desired, the end closure 23 may be omitted.

Figure 3:
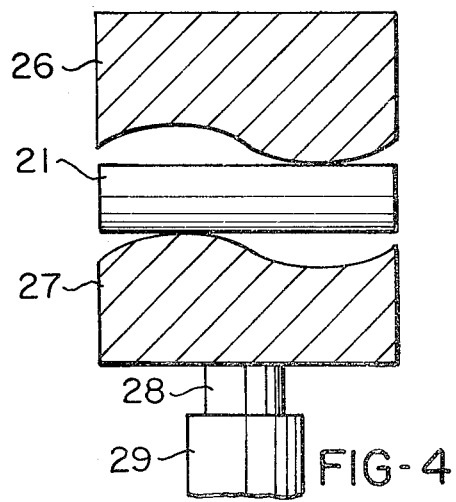
FIG. 3 illustrates the mandrel spacer.

The spacers 11, as shown in FIG. 3, are generally cylindrical and have a raised central portion 24. The central portion 24 has an outside diameter approximately equal to the outside diameter of the mandrel 10. The end portions 25 of the spacer 11 have an outside diameter approximately equal to the inside diameter of the mandrel 11, including where applicable, the end closures 23. The spacer 11 may be solid, although it is presently preferred that it be hollow, in which case the wall thickness of the central portion 24 and the end portions 25 should be sufficient to provide structural integrity of the spacer 11 as the spacer and the mandrels 10 pass through the extruders and the thread reinforcing machine, as shown in FIG. 1. The axial length of the end portions 25 is not critical except to the extent that it should be sufficient to allow the end portion 25 to nest inside the mandrel 10, preferably without leaving a gap of more than about ⅛ inch between the mandrel 10 and the outside surface of the central portion 24 of the spacer 11. The axial length of the central portion 25 is also not critical except that it should be of sufficient length to allow the cutting means 22 to cut through the central portion 25 and the rubber and reinforcing layers therearound, without striking the mandrels 10. Thus, the axial length of the central portion may be from about 5 to about 20 times the cutting width of the cutting means 22.

The spacer 11 may be made of any suitable material, natural or synthetic, such as wood, rubber or a plastic, such as a polyolefin, nylon, phenolic, acrylic or the like. It is presently preferred that the spacers 11 be made of a recycleable synthetic plastic, such as polyethylene or polypropylene.

As noted previously, following application of the second rubber layer 20 over the thread reinforcement 16, the resultant hose assembly is cut into individual lengths 21 by a cutting means 22. Referring again to FIG. 2, it can be seen that the cutting means 22 cuts through the rubber layers 15 and 20, the thread reinforcement 16 and the central portion 24 of the spacer 11, thus leaving about one-half of spacer 11 in each end of the length 21.

In accordance with another embodiment of the present invention, a hose assembly may be separately made and thereafter, installed over the mandrel 10.

Figures 4, 5:
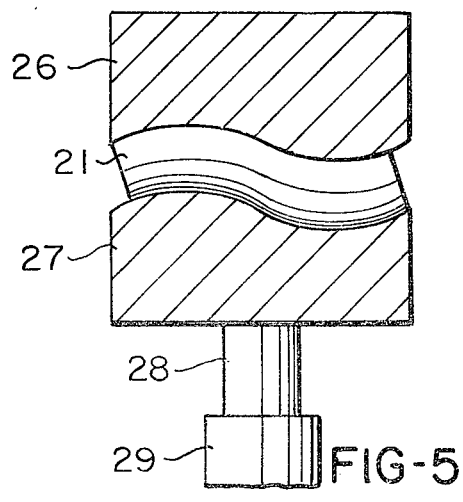
FIGS. 4–6 illustrate deforming the hose assembly and the mandrel to a preselected curvilinear configuration.
Figure 6:
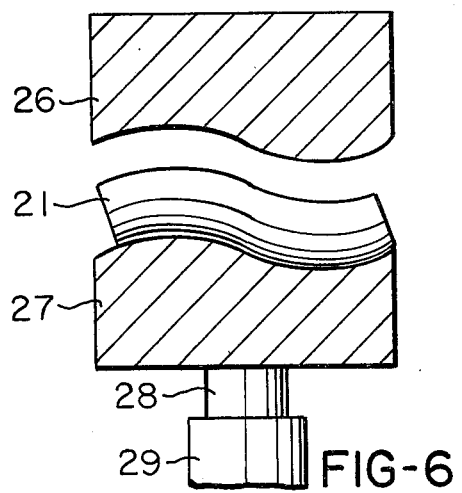

Referring now to FIGS. 4–6, the length 21 is deformed to a preselected curvilinear configuration by first positioning the length 21 in a deforming apparatus comprising a first mold section 26 and a second mold section 27. The mold sections 26 and 27 mate together and provide a mold cavity having a desired curvilinear configuration, such as the S-shaped configuration shown. It should be recognized that the method of the present invention may be employed to provide other, more complex configurations. The first mold section 26 may be stationary and the second mold section 27 may be movable. The second mold section 27 may be moved vertically toward and away from the first mold section 26 by means of hydraulic piston 28 which operates in hydraulic cylinder 29.

The length 21 is shown in FIG. 4 positioned between the mold sections 26 and 27. The hydraulic cylinder 29 is actuated and the second mold section 27 is closed upon the first mold section 26, thereby deforming the length 21, as shown in FIG. 5. When the mold is opened, as shown in FIG. 6, the length 21 retains the predetermined curvilinear configuration to which it has been deformed. The now-deformed length 21 is removed from the deforming apparatus.

Figure 7:
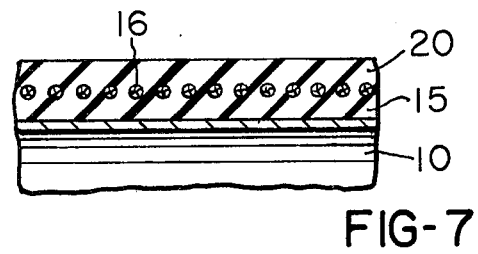
FIG. 7 illustrates the vulcanization of the hose assembly.

The deformed length is then vulcanized, or cured, to at least about 50 percent of the final state of cure. During this partial curing, the length 21 is heated to a curing temperature in the approximate range of 250 to 350 degrees F. under a pressure in the approximate range of 140 to 170 psi. The heating step may be carried out in an autoclave-type vulcanizing apparatus with heat and pressure provided in a desired manner. Heating, under pressure, causes the rubber layers 15 and 20 to flow together and surround and embed the reinforcement 16, as shown in FIG. 7.

Figure 8:
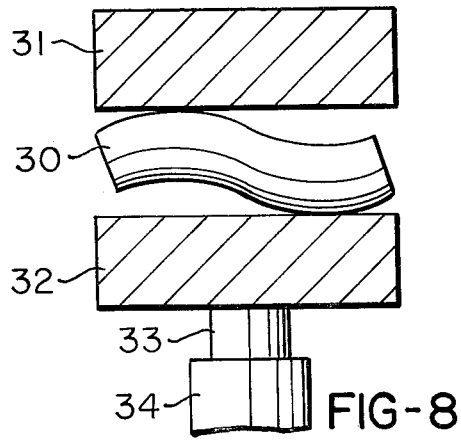
FIGS. 8 and 9 illustrate straightening the curved hose and mandrel and removal of the mandrel.

The next step is to remove the curved mandrel and partially cured hose, now designated 30, from the vulcanizing apparatus and place the assembly in a straightening apparatus comprising a first straightening section 21 and a second straightening section 32, as shown in FIG. 8. The sections 31 and 32 mate together and provide a relatively straight cylindrical cavity. The first straightening section 31 may be stationary and the second straightening section 32 may be movable. The second section 32 may be moved vertically toward and away from the first section 31 by means of hydraulic piston 33 which operates in hydraulic cylinder 34.

Figure 9:
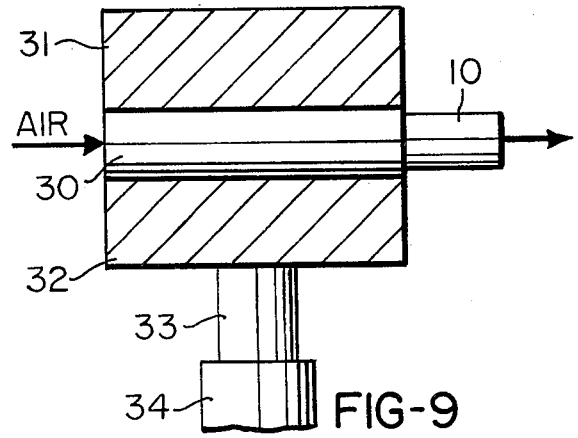

The hydraulic cylinder 34 is actuated and the second straightening section 32 is closed upon the first straightening section 31, thereby straightening the partially cured hose 30 and the mandrel 10. While the partially cured hose 30 is in the straightened configuration, the mandrel 10 is removed, as shown in FIG. 9, such as by introducing air between the hose 30 and the mandrel 10 and pushing out the mandrel 10.

The straightening apparatus is opened and, due to the elastic memory of the partially cured rubber, the hose 30 will return to the preselected curvilinear shape. The partially cured hose is then returned to the vulcanizing apparatus to complete the cure of the rubber. The mandrel 10 may be returned to the apparatus shown in FIG. 1 for use in making further curved hoses.

The term "rubber", as used herein, is intended to include natural and synthetic rubber and rubber-like, or elastomeric materials. At least one of the layers 15 or 20 should be vulcanizable, or otherwise curable. Suitable rubbers include neoprene, SBR, polybutadiene, butadiene-styrene, block copolymers, EPM, EPDM, nitrile, EPR, and the like, including blends thereof.

Reasonable variations and modifications, which will be apparent to those skilled in the art, can be made in this invention without departing from the spirit and scope thereof.

I claim:

1. A method for producing curved hose which comprises, sequentially, the steps of;
   (a) shaping a sheet of a deformable metal to provide a hollow cylinder of a desired length and closing the ends of said cylinder, thereby providing a rigid, deformable mandrel;
   (b) forming a hose assembly around said mandrel by applying a first layer of an elastomeric material around said mandrel, applying a reinforcing member around said first elastomeric layer, and applying a second layer of and elastomeric material around said reinforcing member and said first layer, wherein at least one of said elastomeric layers is vulcanizable;
   (c) deforming said hose assembly and said mandrel to a preselected curvilinear configuration;
   (d) at least partially vulcanizing said hose assembly on said mandrel;
   (e) deforming the resulting partially vulcanized hose and said mandrel to a desired configuration of lesser curviture than said preselected curvilinear configuration;
   (f) separating said mandrel and said partially vulcanized hose;
   (g) allowing said partially vulcanized hose to return to said preselected curvilinear configuration; and
   (h) completing the vulcanization of said hose.

2. The method of claim 1 wherein said partial vulcanizing step (d) comprises vulcanizing said hose assembly to from about 40 to about 70 percent of the total cure.

3. The method of claim 1 wherein said mandrel is made of lead.

4. The method of claim 1 wherein said mandrel is made of aluminum.

5. The method of claim 1 wherein said mandrel is made of steel.

6. A method for producing curved hose which comprises, sequentially, the steps of;
   (a) shaping a sheet of a deformable metal to provide a hollow cylinder of a desired length and closing the ends of said cylinder, thereby providing a rigid deformable mandrel;
   (b) providing a hose assembly comprising a first layer of elastomeric material, a reinforcing member around said first elastomeric layer, and a second layer of an elastomeric material around said reinforcing member and said first layer, wherein at least one of said elastomeric layers is vulcanizable;
(c) placing said hose assembly on said mandrel;
(d) deforming said hose assembly and said mandrel to a preselected curvilinear configuration;
(e) at least partially vulcanizing said hose assembly on said mandrel;
(f) deforming the resulting partially vulcanized hose and said mandrel to a desired configuration of lesser curviture than said preselected curvilinear configuration;
(g) separating said mandrel and said partially vulcanized hose;
(h) allowing said partially vulcanized hose to return to said preselected curvilinear configuration; and
(i) completing the vulcanization of said hose.

7. The method of claim 6 wherein said partial vulcanizing step (e) comprises vulcanizing said hose assembly to from about 40 to about 70 percent of the total cure.

8. The method of claim 6 wherein said mandrel is made of lead.

9. The method of claim 6 wherein said deformable mandrel is made of aluminum.

10. The method of claim 6 wherein said deformable mandrel is made of steel.

11. A method for producing curved hose which comprises, sequentially, the steps of:
a. providing a plurality of rigid, deformable mandrels;
b. arranging said mandrels in end-to-end fashion with a plastic spacing member between each of said mandrels;
c. extruding a first layer of an elastomeric material around said mandrels and said spacing members;
d. applying a reinforcing member around first elastomeric layer;
e. applying a second layer of an elastomeric material around said reinforcing member and said first layer;
f. cutting through said elastomeric material layers and said reinforcing member and said spacing member to provide a plurality of individual hose assemblies on said mandrels;
g. deforming said hose assembly and said mandrel to a preselected curvilinear configuration;
h. at least partially vulcanizing said hose assembly on said mandrel;
i. deforming the resulting partially vulcanized hose and said mandrel to a desired configuration of lesser curvature than said preselected curvilinear configuration;
j. separating said mandrel and said partially vulcanized hose;
k. allowing said partially vulcanized hose to return to said preselected curvilinear configuration;
l. completing the vulcanization of said hose; and,
m. returning said mandrel to said step (b).

12. The method of claim 11 wherein said partial vulcanizing step (h) comprises vulcanizing said hose assembly to from about 40 to about 70 percent of the total cure.

13. The method of claim 11 wherein said mandrels are hollow.

14. The method of claim 11 wherein said mandrels are closed at both ends.

15. The method of claim 11 wherein said mandrels are made of lead.

16. The method of claim 11 wherein said mandrels are made of aluminum.

17. The method of claim 11 wherein said mandrels are made of steel.

* * * * *